United States Patent
Ruan et al.

(10) Patent No.: US 12,113,915 B2
(45) Date of Patent: Oct. 8, 2024

(54) FEDERAL INFORMATION PROCESSING STANDARD (FIPS) COMPLIANT DEVICE IDENTIFIER COMPOSITION ENGINE (DICE) CERTIFICATE CHAIN ARCHITECTURE FOR EMBEDDED SYSTEMS

(71) Applicant: Intel Corporation, Santa Clara, CA (US)

(72) Inventors: Xiaoyu Ruan, Folsom, CA (US); Ned M. Smith, Beaverton, OR (US); Matthew G. Pirretti, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 17/709,274

(22) Filed: Mar. 30, 2022

(65) Prior Publication Data
US 2022/0321361 A1    Oct. 6, 2022

(51) Int. Cl.
*H04L 9/32* (2006.01)
*H04L 9/08* (2006.01)

(52) U.S. Cl.
CPC .......... *H04L 9/3252* (2013.01); *H04L 9/0869* (2013.01)

(58) Field of Classification Search
CPC ... H04L 9/3252; H04L 9/0869; H04L 9/3066; H04L 9/3263; H04L 9/0866; H04L 9/32
See application file for complete search history.

(56) References Cited

U.S. PATENT DOCUMENTS

| | | | |
|---|---|---|---|
| 7,571,315 B1 | 8/2009 | Smith | |
| 2007/0083491 A1* | 4/2007 | Walmsley | G06F 21/608 |
| 2020/0186342 A1* | 6/2020 | Zhang | H04L 9/3247 |
| 2022/0038272 A1* | 2/2022 | Hershman | H04L 9/0866 |
| 2023/0239165 A1* | 7/2023 | Young | H04L 9/0891 |
| | | | 713/175 |
| 2023/0254124 A1* | 8/2023 | Liu | H04L 9/3278 |
| | | | 380/30 |

(Continued)

OTHER PUBLICATIONS

National Institute of Standards and Technology, NIST Special Publication 800-90A, Revision 1, "Recommendation for Random Number Generation Using Deterministic Random Bit Generators," Jun. 2015, 110 pages.

(Continued)

*Primary Examiner* — Quazi Farooqui
(74) *Attorney, Agent, or Firm* — Spectrum IP Law Group LLC

(57) ABSTRACT

Methods and apparatus relating to a Federal Information Processing Standard (FIPS) compliant Device Identifier Composition Engine (DICE) certificate chain architecture for embedded systems are described. In an embodiment, Deterministic Random Bit Generator (DRBG) logic circuitry generates a random number for each layer of a Device Identifier Composition Engine (DICE). The DRBG logic circuitry is a Federal Information Processing Standard (FIPS) approved DRBG logic circuitry. Logic circuitry derives an Elliptic Curve Digital Signature Algorithm (ECDSA) private key for a layer of the DICE based at least in part on one or more operations of a FIPS-approved ECDSA key pair generation logic circuitry. Other embodiments are also disclosed and claimed.

26 Claims, 10 Drawing Sheets

(56) References Cited

U.S. PATENT DOCUMENTS

2023/0273977 A1* 8/2023 Marando ............... G06F 21/575
726/26

OTHER PUBLICATIONS

DICE, Trusted Computing Group, downloaded from "https://trustedcomputinggroup.org/work-groups\dice-architectures" on Mar. 17, 2022, 1 page.

FIPS PUB 186-4, Federal Information Processing Standards Publication, Digital Signature Standard (DSS), Issued Jul. 2013, 130 pages.

Intel Corporation, Cryptographic Module for Intel® Platforms' Security Engine Chipset, Module Version 3.0, FIPS 140-2 Non-Proprietary Security Policy, Doc Version 1.4 Last update: Feb. 11, 2021, 27 pages.

National Institute of Standards and Technology, "FIPS 140-3 Security Requirements for Cryptographic Modules." Mar. 22, 2019, 2 pages, downloaded on Mar. 17, 2022, from "https://csrc.nist.gov/publications/detail/fips/140/3/final."

National Institute of Standards and Technology, "FIPS PUB 140-2 Security Requirements for Cryptographic Modules," May 25, 2001, 69 pages.

National Institute of Standards and Technology, "FIPS PUB 186-5 (Draft) Digital Signature Standard (DSS)," Oct. 2019, 87 pages.

Trusted Computing Group, "DICE Layering Architecture," Version 1.0, Revision 0.19, Jul. 23, 2020, 30 pages.

* cited by examiner

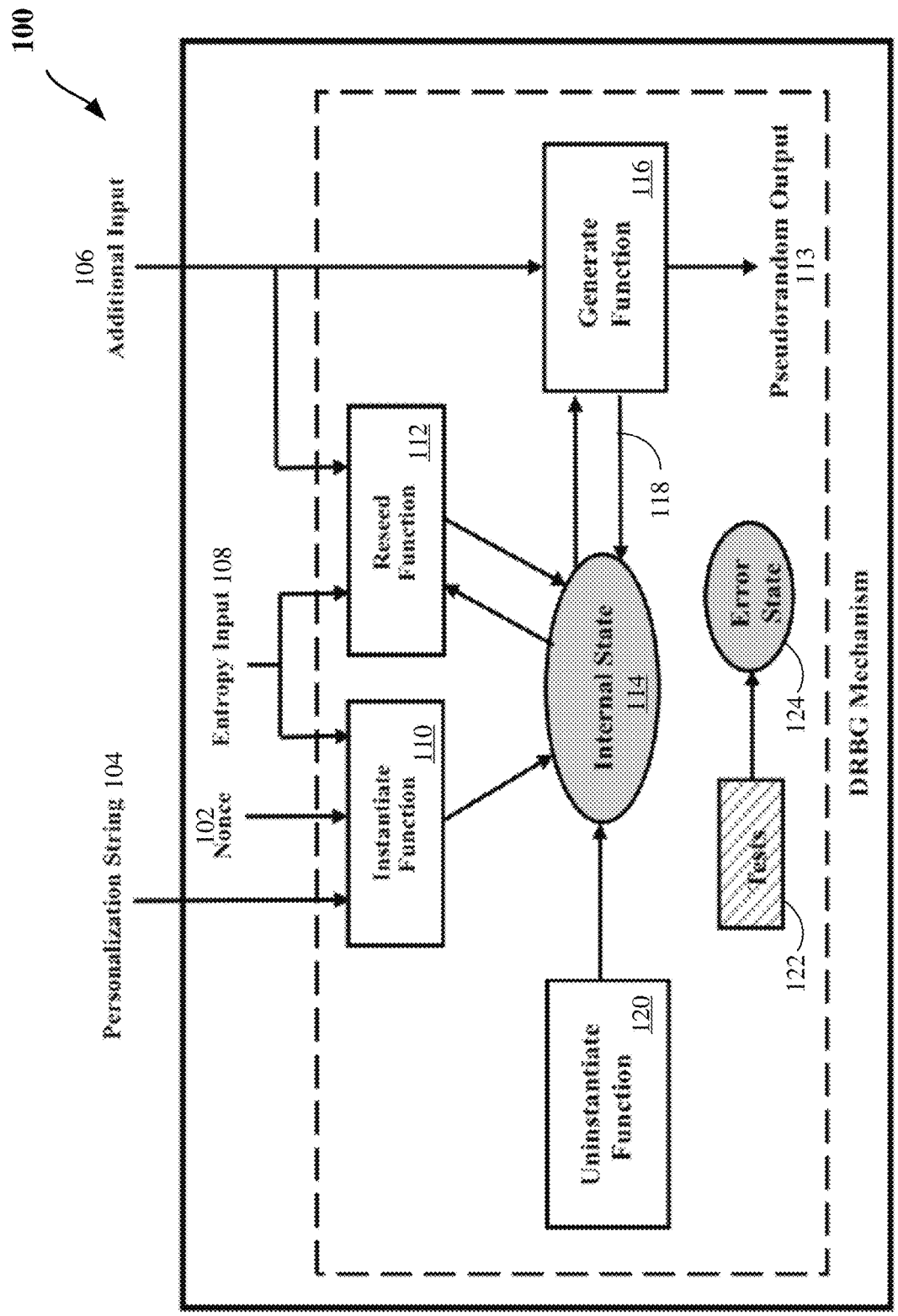
FIG. 1 - *Prior Art*

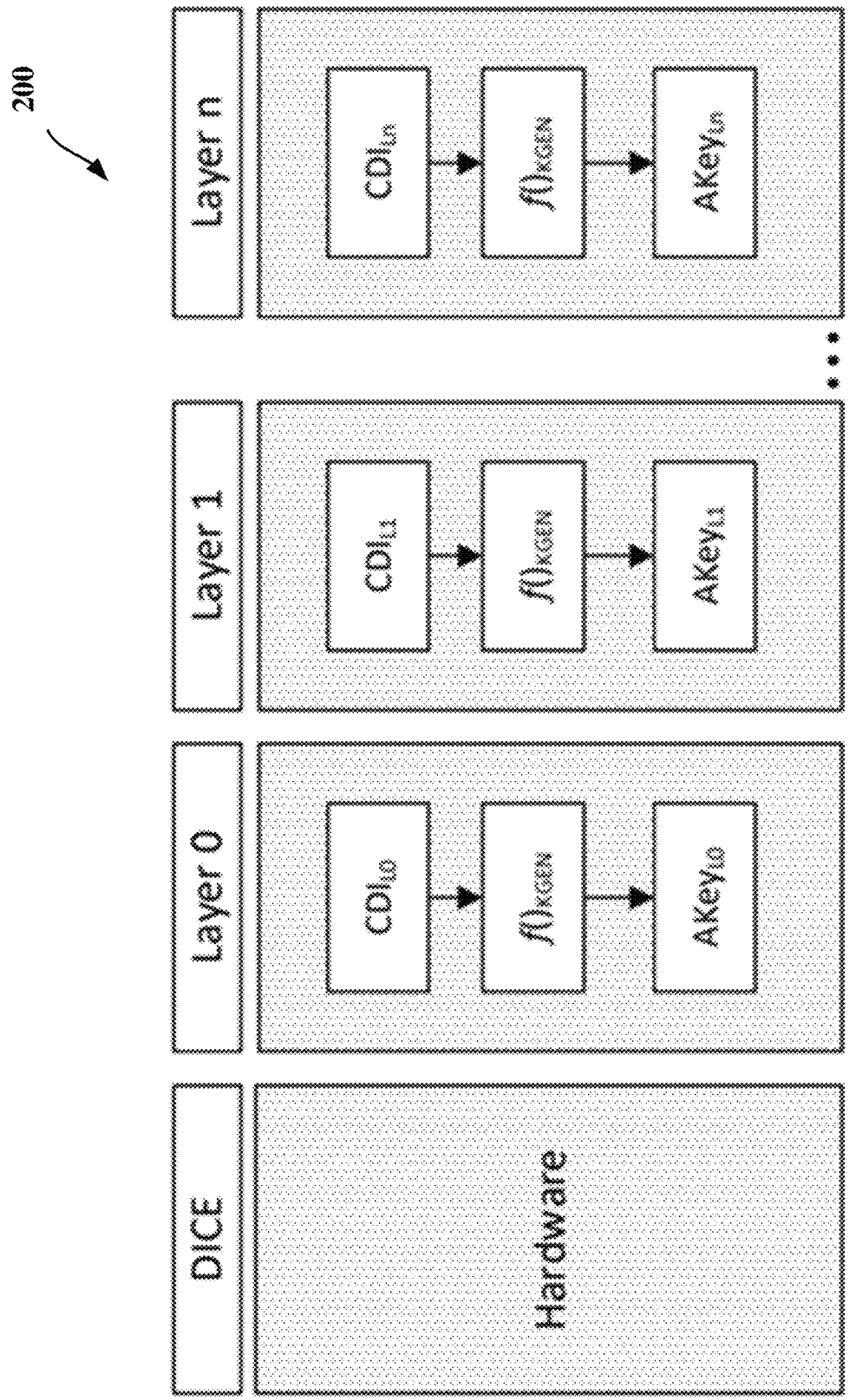
FIG. 2A - *Prior Art*

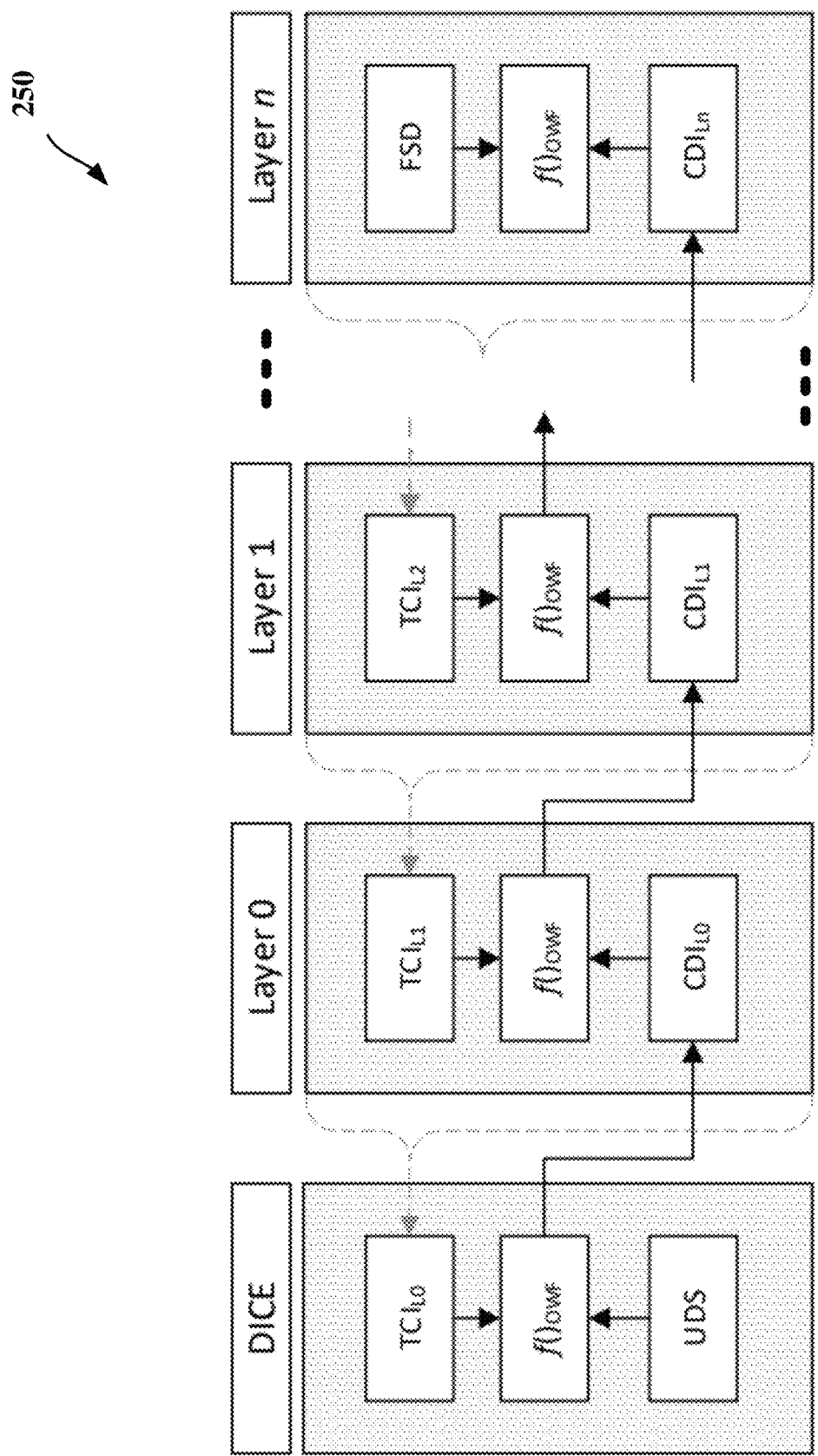
FIG. 2B - *Prior Art*

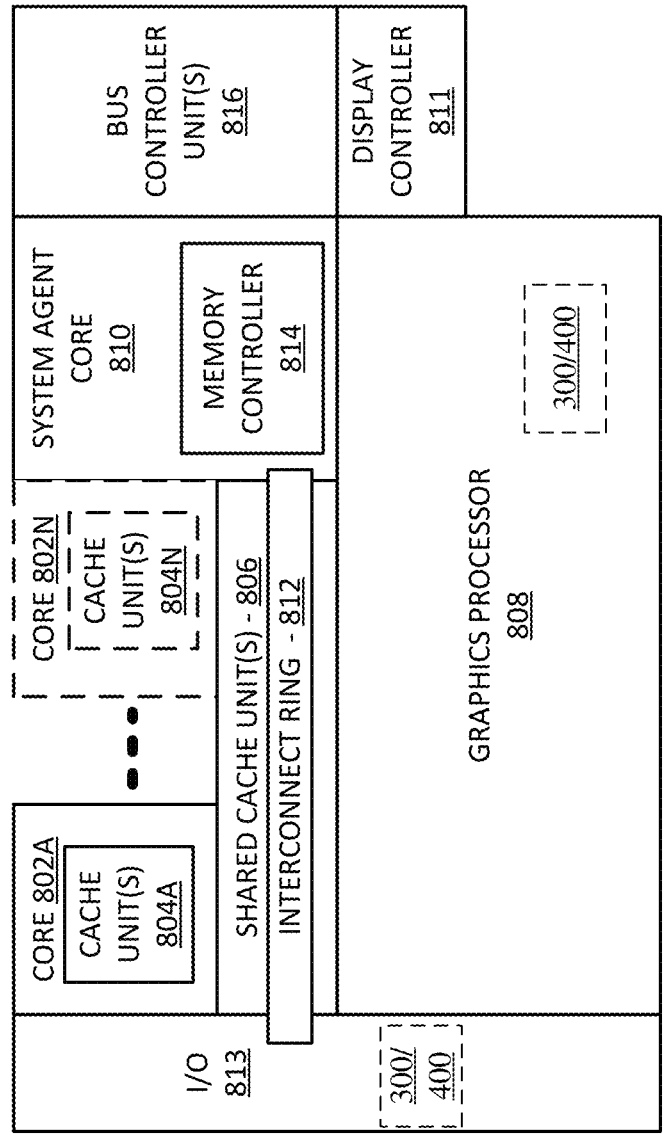
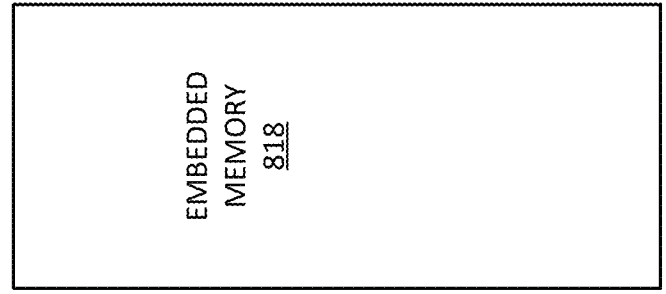
FIG. 8

FEDERAL INFORMATION PROCESSING STANDARD (FIPS) COMPLIANT DEVICE IDENTIFIER COMPOSITION ENGINE (DICE) CERTIFICATE CHAIN ARCHITECTURE FOR EMBEDDED SYSTEMS

FIELD

The present disclosure generally relates to the field of computer security. More particularly, an embodiment relates to techniques for provision of a Federal Information Processing Standard (FIPS) compliant Device Identifier Composition Engine (DICE) certificate chain architecture for embedded systems.

BACKGROUND

Trusted Computing Group (TCG) DICE and FIPS 140-3/FIPS 186 are popular security standards. DICE defines a way to generate an embedded certificate chain and asymmetric keys for each certificate in the chain. On the other hand, FIPS 140-3 and FIPS 186 mandate a specific process for asymmetric key generation. DICE and FIPS pose different requirements on asymmetric key generation.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 1 illustrates a block diagram of a Deterministic Random Bit Generator (DRBG), which may be used in one or more embodiments.

FIGS. 2A and 2B illustrate block diagrams of DICE layering architectures, according to some embodiments.

FIG. 8 is a block diagram of an embodiment of a processor having one or more processor cores, according to some embodiments.

DETAILED DESCRIPTION

Figure 3:
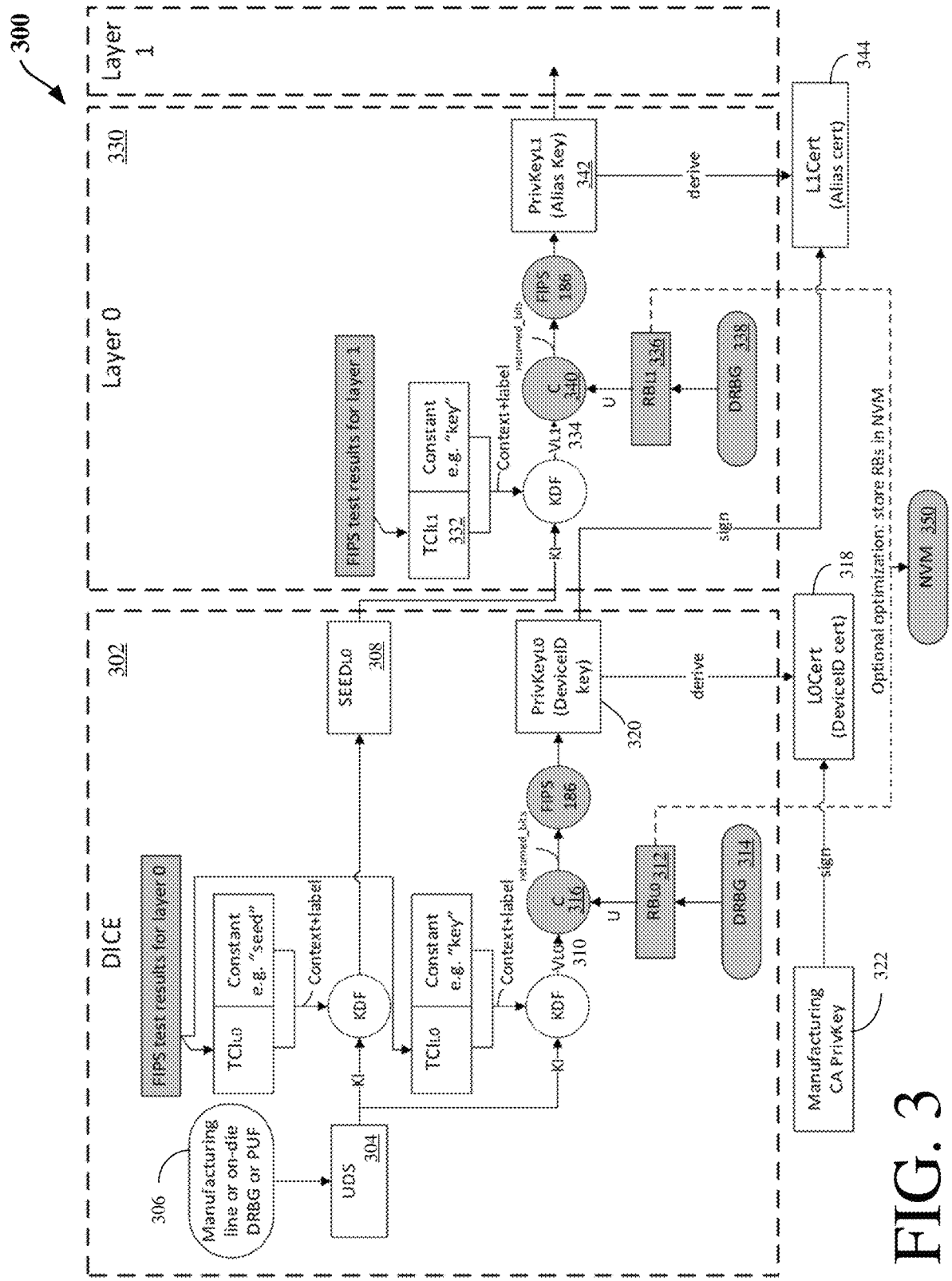
FIGS. 3 and 4 illustrate block diagrams of FIPS-compliant DICE Elliptic Curve Digital Signature Algorithm (ECDSA) key derivation systems, according to some embodiments.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, DICE and FIPS pose different requirements on asymmetric key generation. One technical problem they pose is how to design an embedded certificate chain and key derivation solution that is compliant with the TCG DICE standard while also meeting requirements of the FIPS standard(s).

Currently, there are multiple vendors implementing the TCG DICE family of specifications such as Infineon™ Technologies AG. More particularly, Infineon provides a FIPS-compliant design that attempts to conform with an earlier version of DICE. Other FIPS compliant attestation solutions may be based on a Trusted Platform Module (TPM), where a trusted firmware collects measurements, extends Platform Configuration Registers (PCRs), and signs the PCRs using an attestation key contained in the TPM. This approach differs from DICE in that the TPM approach relies on a policy in the TPM to prevent use of the attestation key if PCR values are not configured a particular way (as contained in the policy). The DICE approach computes a seed value from configuration values and a UDS value that then seeds key generation.

To this end, some embodiments provide a Federal Information Processing Standard (FIPS) compliant Device Identifier Composition Engine (DICE) certificate chain architecture for embedded systems. In an embodiment, a device generates a random number from FIPS-approved Deterministic Random Bit Generator (DRBG) for every DICE layer. The DICE mechanism that may generate a dedicated certificate for every DICE layer. The certificates for all layers form a certificate path or chain. An Elliptic Curve Digital Signature Algorithm (ECDSA) private key for a given DICE layer is derived using a FIPS-approved ECDSA key pair generation method. As discussed herein, a "key pair" generally refers to a pair of public and private keys in asymmetric cryptography.

Each DICE layer may require an ECDSA private key that is derived from a layer-specific random number from DRBG and creation of the layer's CDI (Compound Device Identifier). This FIPS-compliant process of DICE layer key generation is fully compliant with the current TCG DICE specification and can be applied to devices that turn off DICE layer after layer 1 is loaded and devices that do not have DRBG access during firmware update.

An embodiment constructs a value that represents a particular set of security states and their transition from one security state to another security state and constructing a cryptographic key that attests the security state and transitions. One or more embodiments can be used to construct certificate chains on embedded systems that link the security states/transitions to layer specific attestation keys. Further, a "DICE" may sometimes be called a root of trust that anchors as DICE layering. While the layering may be described as a "DICE," such use may be technically construed as incorrect.

By contrast, taking Infineon's design as an example, although it may meet FIPS 140-3 and FIPS 186, it suffers from at least two pitfalls. Both are not compliant with the current TCG DICE layering specification. First, hash of Layer 1 cannot be fed back into the DICE layer (hash of Layer 1 should be fed back to only Layer 0). Second, generation of Layer 1's secret cannot be performed by the DICE layer (it should be performed by Layer 0). It can be presumed that these differences are to accommodate FIPS requirements but they appear to violate the DICE specifications.

Also, Infineon's design requires DRBG during firmware update to generate a new ECDSA key for the updated layer. Some devices do not have DRBG access during firmware update and, hence, cannot use such a design.

FIG. 1 illustrates a block diagram of a Deterministic Random Bit Generator (DRBG) 100, which may be used in one or more embodiments. Further details regarding the DRBG 100 may be found in National Institute of Standards and Technology (NIST) Special Publication (SP) 800-90A (e.g., Revision 1), June 2015.

More particularly, FIG. 1 provides a functional model of a DRBG. A DRBG implements an approved DRBG mechanism and at least one approved randomness source, and may include additional optional sources, including sources for nonces 102, personalization strings 104, and additional input 106. As discussed herein, a "nonce" generally refers to a time-varying value that has at most a negligible chance of repeating, e.g., a random value that is generated anew for each use, a timestamp, a sequence number, or some combination of these.

Entropy input 108 is provided to a DRBG mechanism for the seed using a randomness source. The entropy input 108 and the seed are kept secret. The secrecy of this information provides the basis for the security of the DRBG. At a minimum, the randomness source provides input that supports the security strength requested by the DRBG mechanism.

The entropy input 108 would ideally have full entropy; however, the DRBG mechanisms have been specified so that input with full entropy is not required. This is accommodated by allowing the length of the entropy input to be longer than the required entropy (expressed in bits), as long as the total entropy meets the requirements of the DRBG mechanism. The entropy input can be defined to be of variable length (within specified limits), as well as fixed length. In all cases, the DRBG mechanism expects that when entropy input is requested, the returned bitstring will contain at least the requested amount of entropy.

Other information (e.g., nonce 102, personalization string 104, and/or additional input 106) may be obtained by a DRBG mechanism as input. This information may or may not be required to be kept secret by a consuming application; however, the security of the DRBG itself does not rely on the secrecy of this information. The information should be checked for validity when possible; for example, if time is used as an input, the format and reasonableness of the time could be checked. In most cases, a nonce 102 is required during instantiation. When required, the nonce is combined with the entropy input to create the initial DRBG seed.

A personalization string 104 should be used during DRBG instantiation 110; when used, the personalization string is combined with the entropy input 108 bits and possibly a nonce 102 to create the initial DRBG seed. The personalization string should be unique for all instantiations of the same DRBG mechanism type. Additional input 106 may also be provided during reseeding 112 and when pseudorandom bits 113 are requested.

The internal state 114 is the memory of the DRBG and consists of all of the parameters, variables and other stored values that the DRBG mechanism uses or acts upon. The internal state contains both administrative data (e.g., the security strength) and data that is acted upon and/or modified during the generation of pseudorandom bits 113 (i.e., the working state).

The DRBG mechanism functions handle the DRBG's internal state 114. The DRBG mechanisms may have five separate functions:

1. The instantiate function 110 acquires entropy input 108 and may combine it with a nonce 102 and a personalization string 104 to create a seed from which the initial internal state is created.
2. The generate function 116 generates pseudorandom bits 113 upon request, using the current internal state 114 and possibly additional input 106; a new internal state 118 for the next request is also generated.
3. The reseed function 112 acquires new entropy input 108 and combines it with the current internal state 114 and any additional input 106 that is provided to create a new seed and a new internal state.
4. The uninstantiate function 120 zeroizes (i.e., erases) the internal state 114.
5. The health test function 122 determines that the DRBG mechanism continues to function correctly (and may generate an error state 124 in case it detects an error).

A Device Identity Composition Engine (DICE) is a root of trust for a layered device where DICE layers contain functionality for measuring and attesting to the next layer. Dice layering is a way to construct staged credentials on a device.

At least one embodiment provides methods for layered key derivation and/or generation that are compliant with DICE key derivation requirements and at the same time can be certified under the highest level of FIPS 140-3 certification guidelines.

FIPS requires a module to use DSA (Digital Signature Algorithm), ECDSA, or Rivest, Shamir, & Adleman (RSA) public key encryption technology as a digital signature scheme. Some embodiments provide two different methods. The first method (discussed with reference to FIG. 3) can be suitable for DSA and ECDSA. The second method (discussed with reference to FIG. 4) can be suitable for DSA, ECDSA, and RSA. Even though DICE does not require the key pair to use ECDSA, the way DICE derives the key pair is most easily implemented using ECDSA. As such, ECDSA can be used in the following sessions.

Current ECDSA key pair generation methods are in accordance with FIPS 186-4 B.4.1 and FIPS 186-4 B.4.2. In both methods, returned_bits are output from a DRBG. However, it is not specified how the variable returned_bits could be integrated into a DICE layering solution. To this end, some embodiments (such as the techniques discussed with reference to FIGS. 3 and 4) can be used to integrate such ECDSA key pairs into a DICE layering solution.

Current FIPS 140-3 requirements include:
(1) ECDSA key pair generation follows FIPS 186-4 B.4.1 or FIPS 186-4 B.4.2. The implementation exactly follows the steps without missing or modifying any steps.
(2) All keys are zeroizable (i.e., erasable), including the ECDSA key pairs generated in all layers.
(3) Pairwise consistency self-test is required on every ECDSA key pair generated in all layers.

Some of the terminology discussed herein (e.g., with reference to DICE) can be defined as follows:
UDS: Unique Device Secret. A random number dedicated to this device. The UDS is a secret to this device.
TCI: Trusted Compute Base (TCB) Component Identifier. Components are individually identifiable environments resulting from application of a decomposition method applied to the Attester device. The decomposition method recognizes roots-of-trust and other trusted domains as well as trusted functionality such as claims collection, evidence signing, key derivation and secure layer transition logic. The measurement of a TCB component is used to construct a component identifier. For example, a layer component identifier may consist of a digest of one or more of the following: firmware, configuration, vendor name, product information, version, Security Version Number (SVN), and/or an instance identifier.

CDI: Compound Device Identifier. The CDI is the result of a one-way function that accepts as input (1) the TCI of the next component, and (2) the CDI value received from the previous component.

KDF: Key Derivation Function, such as NIST SP 800-108.

FIG. 2A illustrates a block diagram of a DICE layering architecture 200, which may be utilized in one or more embodiments. The architecture 200 for DICE layer asymmetric key generation shows components used by DICE Layering Architecture, Section 8.2.1.

FIG. 2B, illustrates a block diagram of a DICE layering architecture 250 with CDI, which may be utilized in one or more embodiments. The architecture 250 for DICE layering with CDI shows components used by DICE Layering Architecture, Section 6.2.1.

Referring to FIGS. 2A and 2B, according to the DICE layering architecture, DICE generates an asymmetric key, such as an ECDSA private key AKey_Lx of Layer x from CDI_Lx. And CDI_Lx of Layer x is derived from TCI_Lx and UDS or CDI_L(x−1), where TCI_Lx is the measurement of Layer x.

In summary, FIPS requires ECDSA key to be generated from a random number and DICE requires an ECDSA key to be generated from CDI and TCI. The two are not explicitly aligned. To this end, one or more embodiments resolve this problem with techniques that meet both FIPS 186-4 B.4 and DICE requirements.

Figure 4:
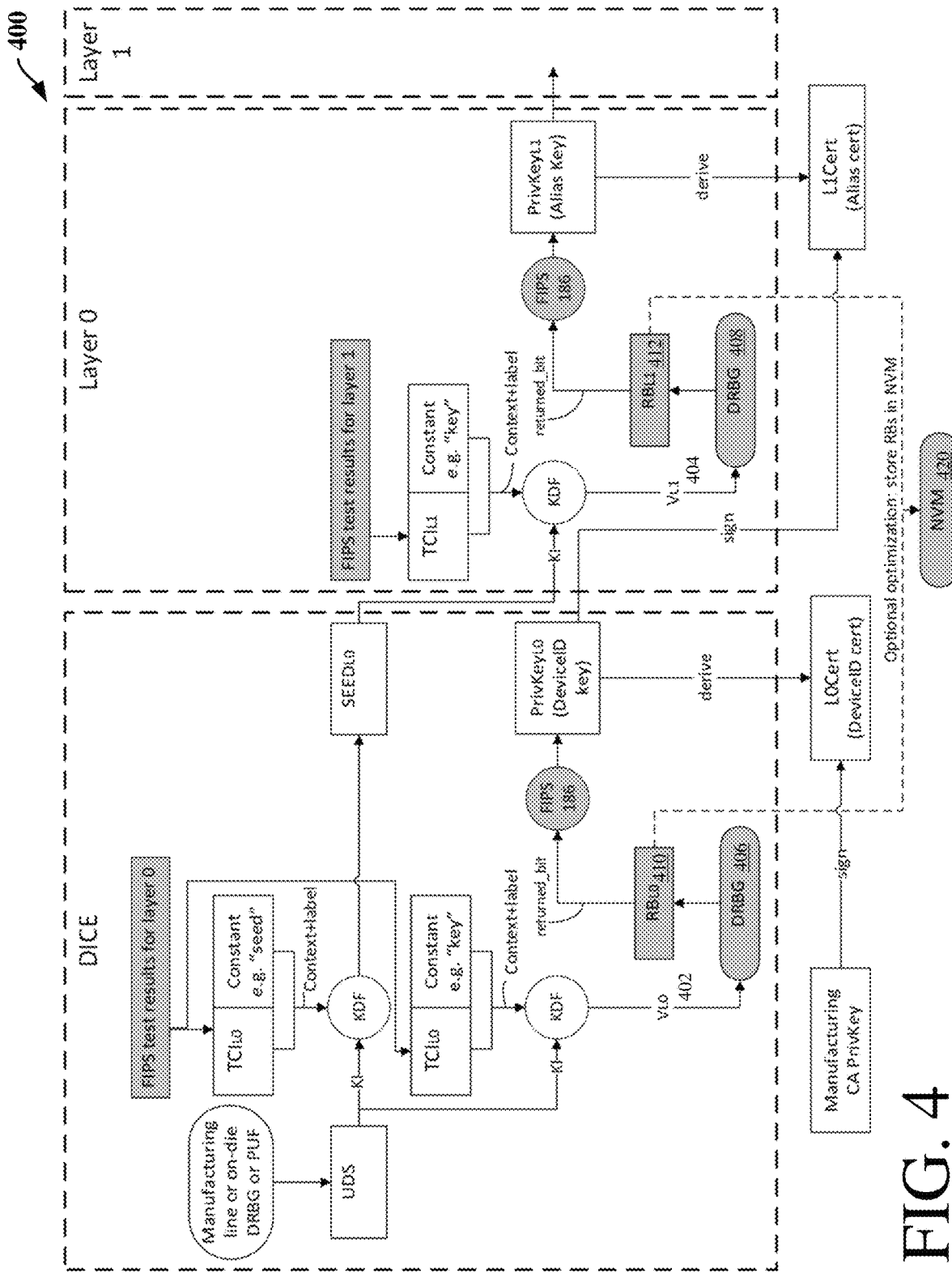

FIG. 3 illustrates a block diagram of a FIPS-compliant DICE ECDSA key derivation system 300, according to an embodiment. System 300 uses a combine function. FIG. 4 illustrates a block diagram of a FIPS-compliant DICE ECDSA key derivation system 400, according to an embodiment. System 400 uses a personalization string. For clarity of the illustration, the examples of FIGS. 3 and 4 show a DICE certificate chain of up to Layer 1. The illustrated approaches can be extended to any number of layers.

Referring to FIG. 3, DICE 302 reads in the UDS 304 from fuses or Physically Unclonable Function (PUF) 306, then derives two CDIs from the UDS. One CDI, "SEED_L0" 308, is for layer 0 to derive private key of layer 1. The other CDI, "V_L0" 310, is used to derive private key of layer 0. The context+label inputs to KDFs for deriving the two CDIs are different, but both inputs include TCI of layer 0 (TCI_L0).

DICE 302 also generates a random number (RB_L0 312) from DRBG 314. As discussed herein, "RB" refers to random bits or a random number. RB_L0 is "combined" (in circle marked "C" 316) with V_L0. The Combine function "C" can be a secure key derivation function (KDF) or logical operation (such as XOR), where the output depends on both inputs RB_L0 and V_L0 and the output maintains the same security strength of RB_L0 and V_L0. The result of the Combine function is input to FIPS 186-4 B.4 ECDSA key pair generation (step 5). The output of the B.4 flow is the private key of layer 0 320. The public key and corresponding certificate (DeviceID certificate 318) for layer 0 are also derived from the private key 320. The vendor or manufacturer then signs the DeviceID certificate with vendor/manufacturer CA private key 322.

Layer 0 330 takes SEED_L0 308 and PrivKey_L0 320 from DICE 302. From SEED_L0 308 and TCI_L1 332, layer 0 derives V_L1. Layer 0 also generates a random number (RB_L1 336) from DRBG 338. RB_L1 336 is combined with V_L1 334 using function C 340 and the result is input to FIPS 186-4 B.4 ECDSA key pair generation (step 5). The output of the B.4 flow is the private key of layer 1 342. The public key and corresponding certificate (Alias certificate 344) for layer 1 are also derived from the private key 342. Layer 0 then signs the Alias certificate with PrivKey_L0 320. Layer 1 takes PrivKey_L1 from layer 0 and uses it for applications, such as attestation.

For device with Non-Volatile Memory (NVM 350, e.g., Serial Peripheral Interface (SPI) flash or field programmable fuse(s)) and do not have access to DRBG during firmware update, the RB generation may be optimized to occur only at first boot and the RBs may be stored in NVM. In all future power cycles, even after firmware update, the RBs are read from NVM and there is no need to regenerate RBs. This is an important advantage of system 300—without using such techniques, devices that cannot access DRBG during firmware update are not able to satisfy both FIPS and DICE requirements.

Referring to FIG. 4, VLx (i.e., VL0 402 and VL1 404) is input to the DRBG (i.e., DRBG 406 and 408, respectively) during generation of RB_Lx (i.e., $RB_{L0}$ 410 and $RB_{L1}$ 412, respectively), and RB_Lx is passed as returned_bits directly to FIPS 186-4 B.4. Step 5. NIST SP 800-90A DRBG is the Digital Random Number Generator (DRNG) required by FIPS 140-3. This DRBG allows an input "personalization string" to participate in the random number generation. The personalization string is an optional string of bits to produce a seed.

In system 400, the CDI of VLx is input to the DRBG as personalization string. This satisfies a DICE requirement that a change to the CDI should result in a change to the key while still satisfying the FIPS requirement that the resulting output RB_Lx is random.

Additionally, for device with non-volatile memory 420, the RB generation may occur only at first boot and the RBs are stored in the NVM 420. Upon firmware update, V_Lx will change. Layer (x−1) uses DRBG to generate new RB_Lx with updated V_Lx.

In both FIGS. 3 and 4, the second TCI+Constant to generate a seed vs. generation of the keys should be called out as a difference from what DICE layering describes or FIPS. Further, this constant is layer specific "seed L0" and "key L0," etc. The combination of all these captures layering semantics in various embodiments.

In an embodiment, FIPS self-test requirements can be improved by putting the results of self-test into the TCI for a given layer. For example, this can be achieved by drawing a dotted line around the FIPS relevant components and adding a self-test module. The self-test module would then feed the TCI block, which is input into the KDF. If the self-test fails, the key will differ and not be able to attest normally.

In various embodiments, RBs play critical security, availability, and/or performance roles, for systems 300 and/or 400, such as:

Every DICE layer has its own RB generated by a FIPS-Approved DRBG such as NIST SP 800-90A. The size of the RB is equal to N+64 (FIPS 186 B.4.1) or N bits (FIPS 186 B.4.2).

The RBs may be generated by on-die DRBG that is implemented by the module, or by the vendor during manufacturing and provisioned to the module.

Per FIPS's secret storage requirement, if the module's physical boundary includes NVM, then RBs can be stored in plaintext in the internal NVM. While the NVM may be outside of the module's logical boundary, it needs to be within the module's physical boundary. If the module's physical boundary does not include NVM, then RBs can use secure storage (e.g., stored encrypted in off-module NVM). The module protects the NVM encryption key.

FIPS may have comprehensive consistency self-test requirements upon ECDSA key pair generation—the module may use the newly generated private key to sign some data and use the associated public key to verify the signature.

If RBs are generated by DRBG within the module, then the resulting ECDSA key pairs are considered generated by the module. In this case, pairwise consistency self-test is required for every layer's ECDSA key pair when the key pair is derived/generated for the first time, i.e., at first boot (when RB is generated) and after the layer's firmware is updated. A layer's firmware update results in the change of "V" and correspondingly the layer's ECDSA key pair. There is no need to perform pairwise consistency self-test in a power cycle where there is no firmware update (and hence no new ECDSA key pair).

If RBs are generated by the vendor and provisioned into the module during manufacturing, then the resulting ECDSA key pairs are considered input to (not generated by) the module. As such, pairwise consistency self-test is not required for any layer's ECDSA key pair. This is one performance advantage of the embodiments of FIGS. 3 and/or 4.

The last layer's ECDSA key pair does not sign any certificate during DICE keychain/certificate chain generation, so a dedicated pairwise consistency self-test is required for it (e.g., at first boot and upon update of last layer firmware). In one embodiment, the implementation uses PrivKeyLn to sign a hard-coded message and verifies the signature.

If the module has limited or no available NVM and cannot afford storing an RB for every layer 0 to n, then it may generate RB_L1 to RB_Ln from DRBG at every boot (however, RB_L0 is stored in NVM instead of generated every boot, because L0Cert is signed by the manufacturer).

Figure 5:
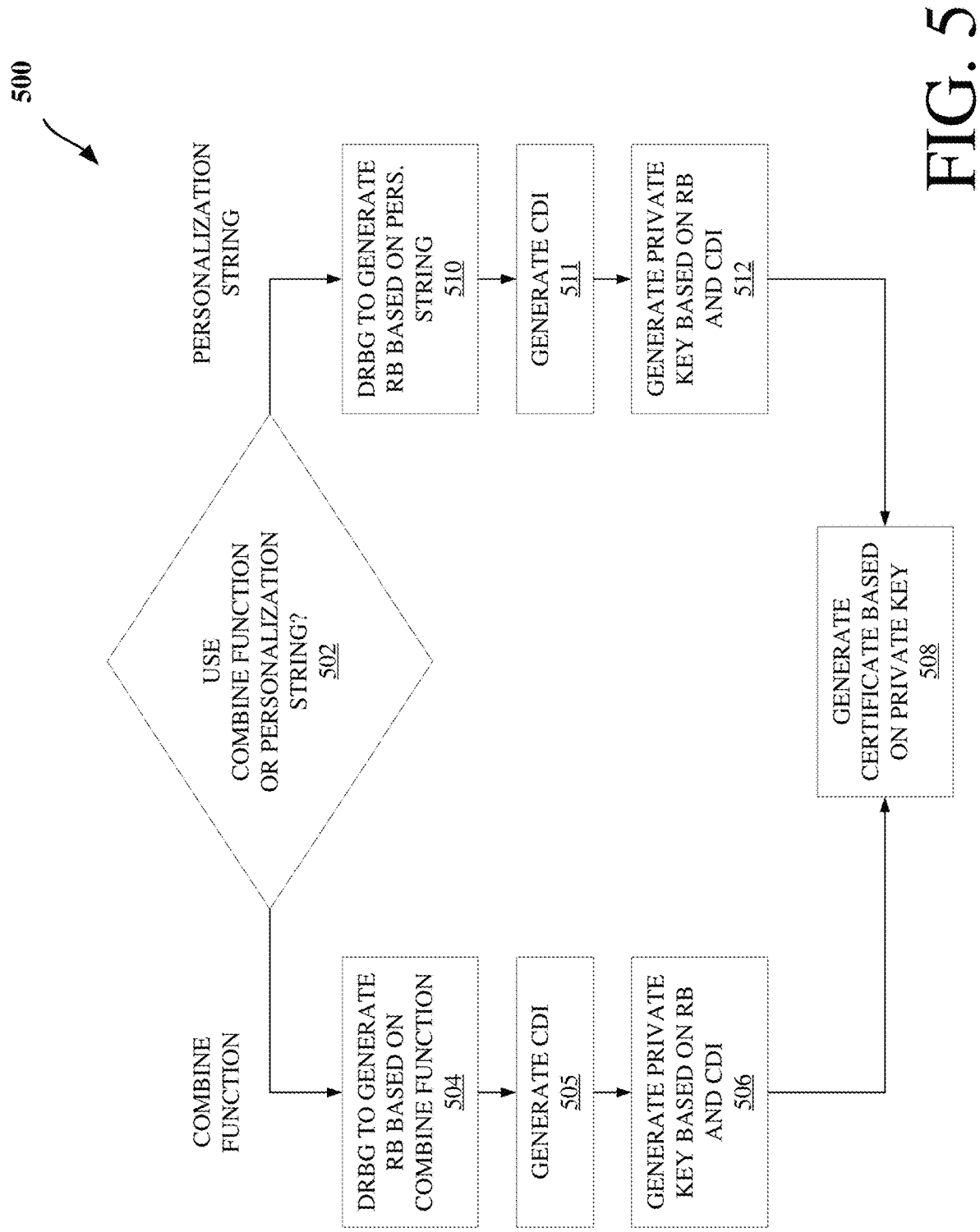
FIG. 5 illustrates a flow diagram of a method to provide a FIPS compliant DICE certificate for an embedded system, according to an embodiment.

FIG. 5 illustrates a flow diagram of a method 500 to provide a FIPS compliant DICE certificate for an embedded system, according to an embodiment. One or more components discussed with reference to FIGS. 1-4 may be used to perform one or more of the operations of method 500.

Referring to FIGS. 3-5, at an operation 502 it is determined whether to use a combine function (e.g., system 300) or a personalization string (e.g., system 400). For a combine function at operation 504, a DRBG generates a random number based on the combination function such as discussed with reference to FIG. 3. At operation 505, a CDI is generated. Operation 506 then generates a private key based on the RB of operation 504 and CDI of operation 505 such as discussed with reference to FIG. 3. Operation 508 then generates a certificate based on the private key of operation 506, such as discussed with reference to FIG. 3.

Alternatively, for a personalization string approach at an operation 510, the DRBG generates a random number based on the personalization string, such as discussed with reference to FIG. 4. At operation 511, a CDI is generated. Operation 512 then generates a private key based on the RB of operation 510 and CDI of operation 511 such as discussed with reference to FIG. 4. Operation 508 then generates a certificate based on the private key of operation 512, such as discussed with reference to FIG. 4.

Additionally, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Figure 6:
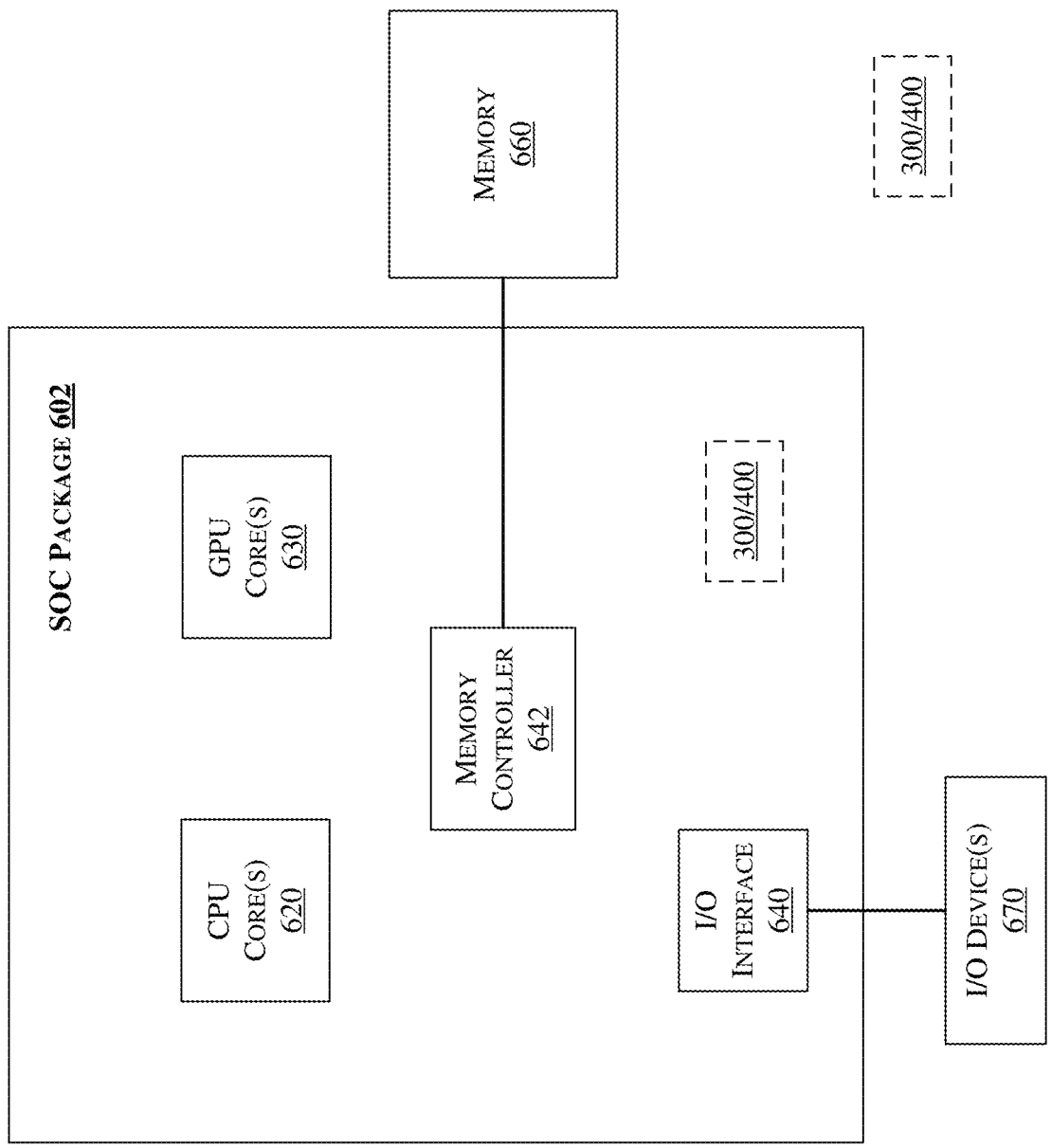
FIG. 6 illustrates a block diagram of an SOC (System On Chip) package in accordance with an embodiment.

FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 602 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like.

Figure 7:
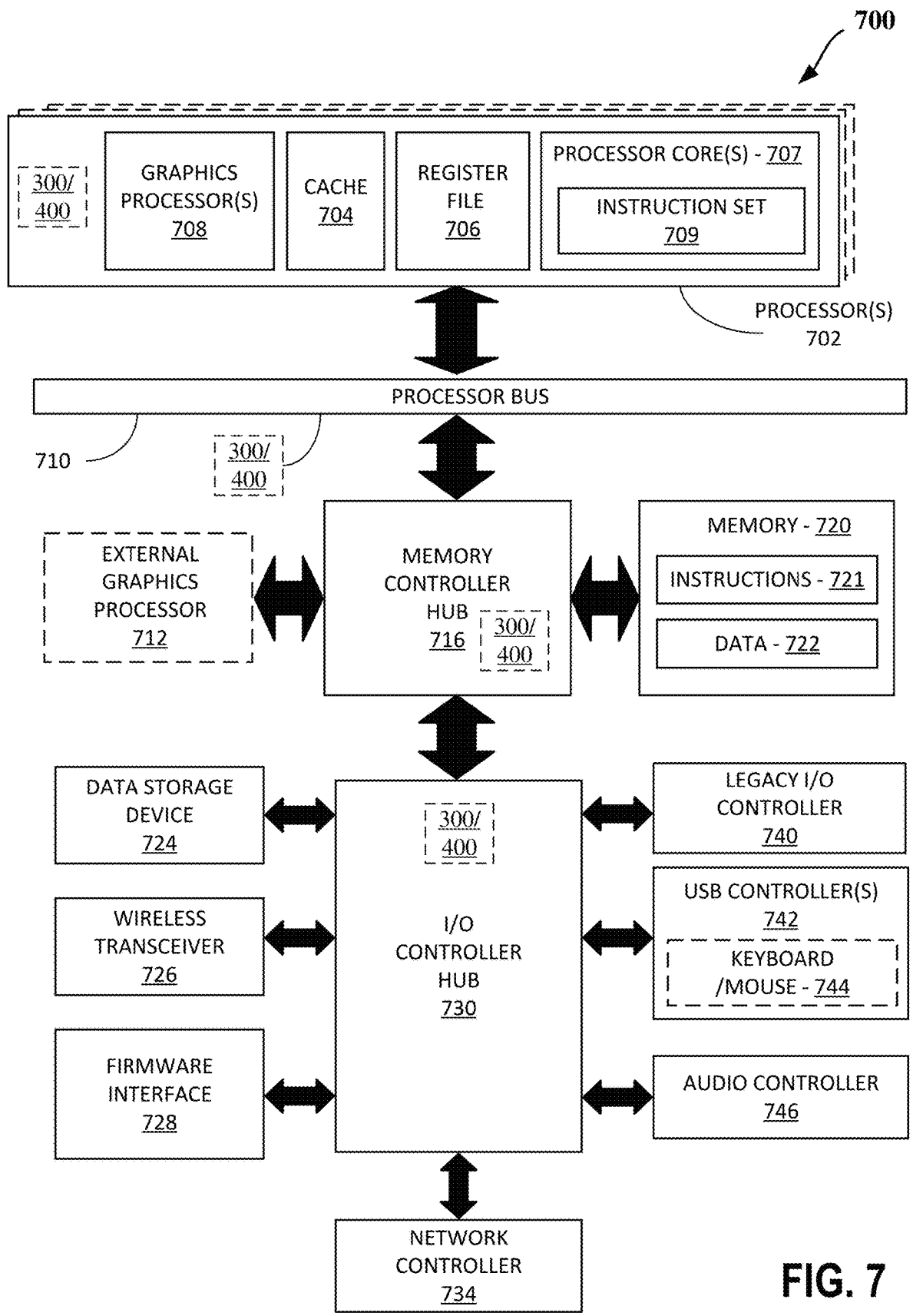
FIG. 7 is a block diagram of a processing system, according to an embodiment.

FIG. 7 is a block diagram of a processing system 700, according to an embodiment. In various embodiments the system 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random access memory (DRAM) device, a static random access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

FIG. 8 is a block diagram of an embodiment of a processor 800 having one or more processor cores 802A to 802N, an integrated memory controller 814, and an integrated graphics processor 808. Those elements of FIG. 8 having the same reference numbers (or names) as the elements of any other figure herein can operate or function in any manner similar to that described elsewhere herein, but are not limited to such. Processor 800 can include additional cores up to and including additional core 802N represented by the dashed lined boxes. Each of processor cores 802A to 802N includes one or more internal cache units 804A to 804N. In some embodiments each processor core also has access to one or more shared cached units 806.

The internal cache units 804A to 804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A to 804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A to 802N include support for simultaneous multi-threading. In such embodiment, the system agent core 810 includes components for coordinating and operating cores 802A to 802N during multi-threaded processing. System agent core 810 may additionally include a power control unit (PCU), which includes logic and components to regulate the power state of processor cores 802A to 802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect, or may be integrated within the graphics processor 808 or system agent core 810.

In some embodiments, a ring based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802 to 802N and graphics processor 808 use embedded memory modules 818 as a shared Last Level Cache.

In some embodiments, processor cores 802A to 802N are homogenous cores executing the same instruction set architecture. In another embodiment, processor cores 802A to 802N are heterogeneous in terms of instruction set architecture (ISA), where one or more of processor cores 802A to 802N execute a first instruction set, while at least one of the other cores executes a subset of the first instruction set or a different instruction set. In one embodiment processor cores 802A to 802N are heterogeneous in terms of microarchitecture, where one or more cores having a relatively higher power consumption couple with one or more power cores having a lower power consumption. Additionally, processor 800 can be implemented on one or more chips or as an SoC integrated circuit having the illustrated components, in addition to other components.

Figure 9:
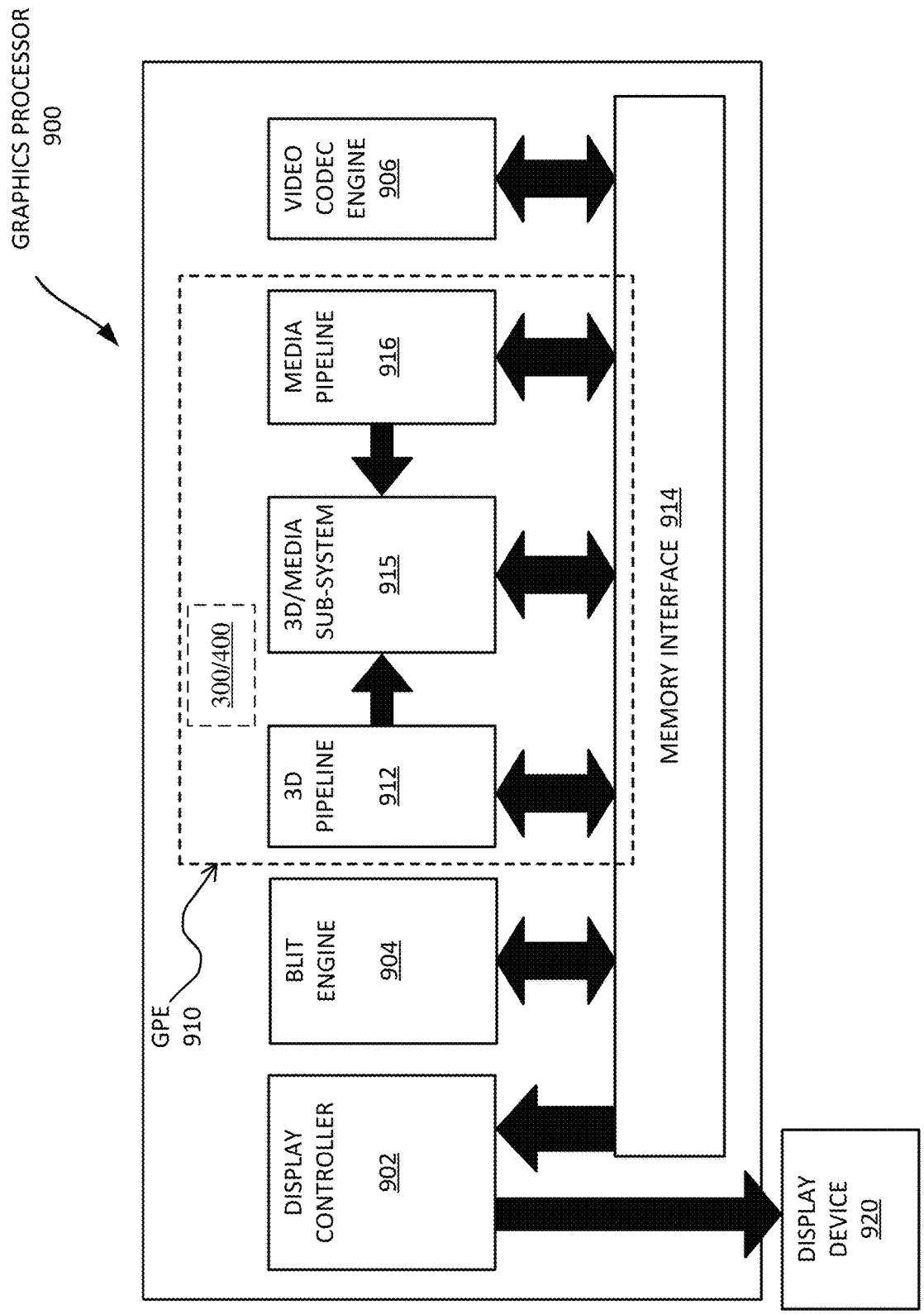
FIG. 9 is a block diagram of a graphics processor, according to an embodiment.

FIG. 9 is a block diagram of a graphics processor 900, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 900 includes a memory interface 914 to access memory. Memory interface 914 can be an interface to local memory, one or more internal caches, one or more shared external caches, and/or to system memory.

In some embodiments, graphics processor 900 also includes a display controller 902 to drive display output data to a display device 920. Display controller 902 includes hardware for one or more overlay planes for the display and composition of multiple layers of video or user interface elements. In some embodiments, graphics processor 900 includes a video codec engine 906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 900 includes a block image transfer (BLIT) engine 904 to perform two-dimensional (2D) rasterizer operations including, for example, bit-boundary block transfers. However, in one embodiment, 3D graphics operations are performed using one or more components of graphics processing engine (GPE) 910. In some embodiments, graphics processing engine 910 is a compute engine for performing graphics operations, including three-dimensional (3D) graphics operations and media operations.

In some embodiments, GPE 910 includes a 3D pipeline 912 for performing 3D operations, such as rendering three-dimensional images and scenes using processing functions that act upon 3D primitive shapes (e.g., rectangle, triangle, etc.). The 3D pipeline 912 includes programmable and fixed function elements that perform various tasks within the element and/or spawn execution threads to a 3D/Media sub-system 915. While 3D pipeline 912 can be used to perform media operations, an embodiment of GPE 910 also includes a media pipeline 916 that is specifically used to perform media operations, such as video post-processing and image enhancement.

In some embodiments, media pipeline 916 includes fixed function or programmable logic units to perform one or more specialized media operations, such as video decode acceleration, video de-interlacing, and video encode acceleration in place of, or on behalf of video codec engine 906. In some embodiments, media pipeline 916 additionally includes a thread spawning unit to spawn threads for execution on 3D/Media sub-system 915. The spawned threads perform computations for the media operations on one or more graphics execution units included in 3D/Media sub-system 915.

In some embodiments, 3D/Media subsystem 915 includes logic for executing threads spawned by 3D pipeline 912 and media pipeline 916. In one embodiment, the pipelines send thread execution requests to 3D/Media subsystem 915, which includes thread dispatch logic for arbitrating and dispatching the various requests to available thread execution resources. The execution resources include an array of graphics execution units to process the 3D and media threads. In some embodiments, 3D/Media subsystem 915 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: Deterministic Random Bit Generator (DRBG) logic circuitry to generate a random number for each layer of a Device Identifier Composition Engine (DICE), wherein the DRBG logic circuitry is a Federal Information Processing Standard (FIPS) approved DRBG logic circuitry; and derivative logic circuitry to derive an Elliptic Curve Digital Signature Algorithm (ECDSA) private key for a layer of the DICE based at least in part on one or more operations of a FIPS-approved ECDSA key pair generation logic circuitry. Example 2 includes the apparatus of example 1, comprising logic circuitry to generate a certificate for the layer based at least in part on the private key. Example 3 includes the apparatus of example 2, wherein the certificate is to be generated based at least in part on a combine function or a personalization string. Example 4 includes the apparatus of example 3, wherein the combine function is to combine the random number with a Compound Device Identifier (CDI). Example 5 includes the apparatus of example 4, wherein the CDI is to be derived from a Unique Device Secret (UDS). Example 6 includes the apparatus of example 3, wherein the DRBG logic circuitry is to generate the random number based at least in part on the personalization string. Example 7 includes the apparatus of example 1, wherein the FIPS-approved ECDSA key pair generation logic circuitry is to generate a key pair, wherein the key pair comprises the ECDSA private key. Example 8 includes the apparatus of example 1, further comprising a plurality of DRBG logic circuitry to generate a plurality of random numbers, wherein each of the random numbers is to correspond to a separate layer of the DICE. Example 9 includes the apparatus of example 1, comprising logic circuitry to generate a CDI for at least one layer of the DICE. Example 10 includes the apparatus of example 1, comprising logic circuitry to construct at least one certificate chain on an embedded system to link a secure state and transition to a specific attestation key for the layer. Example 11 includes the apparatus of example 1, further comprising a Non-Volatile Memory (NVM) device to store the random number. Example 12 includes the apparatus of example 11, wherein the NVM device comprises one or more of: a Serial Peripheral Interface (SPI) flash and one or more field programmable fuses. Example 13 includes the apparatus of example 1, further comprising an NVM device to store the random number at a first boot. Example 14 includes the apparatus of example 1, further comprising an NVM device to store the random number at a first boot, wherein the random number stored in the NVM is to be accessed for any future power cycles. Example 15 includes the apparatus of example 1, wherein the DICE is a Trusted Computing Group (TCG) DICE.

Example 16 includes a method comprising: generating, at Deterministic Random Bit Generator (DRBG) logic circuitry, a random number for each layer of a Device Identifier Composition Engine (DICE), wherein the DRBG logic circuitry is a Federal Information Processing Standard (FIPS) approved DRBG logic circuitry; and deriving, at derivative logic circuitry, an Elliptic Curve Digital Signature Algorithm (ECDSA) private key for a layer of the DICE based at least in part on one or more operations of a FIPS-approved ECDSA key pair generation logic circuitry. Example 17 includes the method of example 16, further comprising generating a certificate for the layer based at least in part on the private key. Example 18 includes the method of example 16, further comprising generating a CDI for at least one layer of the DICE. Example 19 includes the method of example 16, further comprising constructing at least one certificate chain on an embedded system to link a secure state and transition to a specific attestation key for the layer.

Example 20 includes one or more non-transitory computer-readable media comprising one or more instructions that when executed on a processor configure the processor to perform one or more operations to cause: Deterministic Random Bit Generator (DRBG) logic circuitry to generate a random number for each layer of a Device Identifier Composition Engine (DICE), wherein the DRBG logic circuitry is a Federal Information Processing Standard (FIPS) approved DRBG logic circuitry; and derivative logic circuitry to derive an Elliptic Curve Digital Signature Algorithm (ECDSA) private key for a layer of the DICE based at least in part on one or more operations of a FIPS-approved ECDSA key pair generation logic circuitry. Example 21 includes the one or more computer-readable media of example 20, further comprising one or more instructions that when executed on the at least one processor configure the at least one processor to perform one or more operations to cause generation of a certificate for the layer based at least in part on the private key. Example 22 includes the one or more computer-readable media of example 20, further comprising one or more instructions that when executed on the at least one processor configure the at least one processor to perform one or more operations to cause generation of a certificate for the layer based at least in part on the private key. Example 23 includes the one or more computer-readable media of example 20, further comprising one or more instructions that when executed on the at least one processor configure the at least one processor to perform one or more operations to cause generation of a CDI for at least one layer of the DICE. Example 24 includes the one or more computer-readable media of example 20, further comprising one or more instructions that when executed on the at least one processor configure the at least one processor to perform one or more operations to cause construction of at least one certificate chain on an embedded system to link a secure state and transition to a specific attestation key for the layer.

Example 25 includes an apparatus comprising means to perform an operation as set forth in any preceding example. Example 26 includes machine-readable storage including machine-readable instructions, when executed, to implement an operation or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. An apparatus comprising:
Deterministic Random Bit Generator (DRBG) logic circuitry to generate a random number for each layer of a Device Identifier Composition Engine (DICE), wherein the DRBG logic circuitry is a Federal Information Processing Standard (FIPS) approved DRBG logic circuitry; and derivative logic circuitry to derive an Elliptic Curve Digital Signature Algorithm (ECDSA) private key for a layer of the DICE based at least in part on one or more operations of a FIPS-approved ECDSA key pair generation logic circuitry, wherein at least one certificate chain on an embedded system is to be constructed to link a secure state and transition to a specific attestation key for the layer.

2. The apparatus of claim 1, comprising logic circuitry to generate a certificate for the layer based at least in part on the private key.

3. The apparatus of claim 2, wherein the certificate is to be generated based at least in part on a combine function or a personalization string.

4. The apparatus of claim 3, wherein the combine function is to combine the random number with a Compound Device Identifier (CDI).

5. The apparatus of claim 4, wherein the CDI is to be derived from a Unique Device Secret (UDS).

6. The apparatus of claim 3, wherein the DRBG logic circuitry is to generate the random number based at least in part on the personalization string.

7. The apparatus of claim 1, wherein the FIPS-approved ECDSA key pair generation logic circuitry is to generate a key pair, wherein the key pair comprises the ECDSA private key.

8. The apparatus of claim 1, further comprising a plurality of DRBG logic circuitry to generate a plurality of random numbers, wherein each of the random numbers is to correspond to a separate layer of the DICE.

9. The apparatus of claim 1, comprising logic circuitry to generate a CDI for at least one layer of the DICE.

10. The apparatus of claim 1, further comprising a Non-Volatile Memory (NVM) device to store the random number.

11. The apparatus of claim 10, wherein the NVM device comprises one or more of: a Serial Peripheral Interface (SPI) flash and one or more field programmable fuses.

12. The apparatus of claim 1, further comprising an NVM device to store the random number at a first boot.

13. The apparatus of claim 1, further comprising an NVM device to store the random number at a first boot, wherein the random number stored in the NVM is to be accessed for any future power cycles.

14. The apparatus of claim 1, wherein the DICE is a Trusted Computing Group (TCG) DICE.

15. A method comprising:
generating, at Deterministic Random Bit Generator (DRBG) logic circuitry, a random number for each layer of a Device Identifier Composition Engine (DICE), wherein the DRBG logic circuitry is a Federal Information Processing Standard (FIPS) approved DRBG logic circuitry;
deriving, at derivative logic circuitry, an Elliptic Curve Digital Signature Algorithm (ECDSA) private key for a layer of the DICE based at least in part on one or more operations of a FIPS-approved ECDSA key pair generation logic circuitry; and
constructing at least one certificate chain on an embedded system to link a secure state and transition to a specific attestation key for the layer.

16. The method of claim 15, further comprising generating a certificate for the layer based at least in part on the private key.

17. The method of claim 15, further comprising generating a CDI for at least one layer of the DICE.

18. The method of claim 15, further comprising generating a plurality of random numbers, wherein each of the random numbers is to correspond to a separate layer of the DICE.

19. One or more non-transitory computer-readable media comprising one or more instructions that when executed on a processor configure the processor to perform one or more operations to cause:
Deterministic Random Bit Generator (DRBG) logic circuitry to generate a random number for each layer of a Device Identifier Composition Engine (DICE), wherein the DRBG logic circuitry is a Federal Information Processing Standard (FIPS) approved DRBG logic circuitry; and
derivative logic circuitry to derive an Elliptic Curve Digital Signature Algorithm (ECDSA) private key for a layer of the DICE based at least in part on one or more operations of a FIPS-approved ECDSA key pair generation logic circuitry; and
construction of at least one certificate chain on an embedded system to link a secure state and transition to a specific attestation key for the layer.

20. The one or more computer-readable media of claim 19, further comprising one or more instructions that when executed on the at least one processor configure the at least one processor to perform one or more operations to cause generation of a certificate for the layer based at least in part on the private key.

21. The one or more computer-readable media of claim 19, further comprising one or more instructions that when executed on the at least one processor configure the at least one processor to perform one or more operations to cause generation of a certificate for the layer based at least in part on the private key.

22. The one or more computer-readable media of claim 19, further comprising one or more instructions that when executed on the at least one processor configure the at least one processor to perform one or more operations to cause generation of a CDI for at least one layer of the DICE.

23. The one or more computer-readable media of claim 19, further comprising one or more instructions that when executed on the at least one processor configure the at least one processor to perform one or more operations to cause generation of a plurality of random numbers, wherein each of the random numbers is to correspond to a separate layer of the DICE.

24. An apparatus comprising:
Deterministic Random Bit Generator (DRBG) logic circuitry to generate a random number for each layer of a Device Identifier Composition Engine (DICE), wherein the DRBG logic circuitry is a Federal Information Processing Standard (FIPS) approved DRBG logic circuitry; and
derivative logic circuitry to derive an Elliptic Curve Digital Signature Algorithm (ECDSA) private key for a layer of the DICE based at least in part on one or more operations of a FIPS-approved ECDSA key pair generation logic circuitry,
wherein a plurality of DRBG logic circuitry is to generate a plurality of random numbers, wherein each of the random numbers is to correspond to a separate layer of the DICE.

25. The apparatus of claim 24, comprising logic circuitry to generate a certificate for the layer based at least in part on the private key.

26. The apparatus of claim 24, comprising logic circuitry to construct at least one certificate chain on an embedded system to link a secure state and transition to a specific attestation key for the layer.

* * * * *